United States Patent [19]

Marten

[11] Patent Number: 5,137,335
[45] Date of Patent: Aug. 11, 1992

[54] SUPPORT APPARATUS OPERABLE TO SUPPORT A CHILD OR THE LIKE

[76] Inventor: Tamera J. Marten, 11453 N. Newmark, Clovis, Calif. 93612

[21] Appl. No.: 643,040

[22] Filed: Jan. 18, 1991

[51] Int. Cl.$^5$ .............................................. A47C 31/00
[52] U.S. Cl. ................................... 297/485; 297/488; 297/181; 297/250
[58] Field of Search ............... 257/181, 464, 487, 488, 257/486, 482, 216, 250

[56] References Cited

U.S. PATENT DOCUMENTS

| | | | |
|---|---|---|---|
| 2,924,266 | 2/1960 | Goldberg | 297/487 |
| 3,722,951 | 3/1973 | Ezquerra | 297/488 |
| 3,767,259 | 10/1973 | Blake et al. | 297/250 |
| 3,901,550 | 8/1975 | Hamy | 297/488 X |
| 4,607,885 | 8/1986 | Del Fierro | 297/485 X |
| 4,759,588 | 7/1988 | Husnik | 297/181 X |
| 4,909,573 | 3/1990 | Barry et al. | 297/181 X |

*Primary Examiner*—Peter A. Schenbrenner
*Attorney, Agent, or Firm*—Worrel & Worrel

[57] ABSTRACT

An apparatus for supporting a child or the like in a predetermined attitude comprising a base member adapted to be secured in substantially fixed position on a supporting object and having a surface deployed for engagement by the child in a substantially rested position thereon; and means borne by said base member positionable for engagement with a portion of the child in supporting relation in said predetermined attitude when the child is in said rested position.

5 Claims, 2 Drawing Sheets

SUPPORT APPARATUS OPERABLE TO SUPPORT A CHILD OR THE LIKE

BACKGROUND OF THE INVENTION

1. Field of the Invention

The present invention relates to a support apparatus and more particularly to such a support apparatus which is operable to afford additional support for children who are too large for infant car seats, but not sufficiently developed to be able comfortably and safely to rely exclusively upon the support afforded by conventional vehicle seats and their associated seat belt assemblies.

2. Description of the Prior Art

Considerable technological effort has been devoted to the development of infant safety seats for use in vehicles securely to retain and otherwise to protect infants traveling in the vehicles from injury. However, the transition from infancy to childhood has not seen a concomitant focus of attention. This fact is borne out by infant and child mortality tables which reveal that often an infant is more likely to survive a vehicular accident than is a child of toddler age or older. The reasons for this disparity are both biological and sociological.

An infant is completely incapable of caring for itself and, therefore, the use of an auxiliary support system is absolutely essential where infants are transported in vehicles of a variety of types. However, those infant safety seats which have been developed are clearly limited as to the size of the infant or child which they are capable of receiving. Accordingly, shortly after infancy the child out grows the capacity of the infant safety seat and so must utilize the conventional adult sized seat and the seat belt assembly thereof.

While children are fully capable of being strapped into the adult seat using the conventional seat belt assembly, a myriad of difficulties are presented thereby which continue until the child is much older. Since the child is of small size, he or she is incapable of seeing out the windows when so seated in the adult sized seat. The natural curiosity of children ensures that they immediately want to free themselves from the limitation presented by the seat belt assembly so that they are able to see out of the vehicle through the windows. Similarly, active children instinctively resist the lack of mobility presented by such restraint. Parents presented with a resistance to such restrain in the form of an emotional outpouring, frequently give in and free the child to roam around in the vehicle. The hazard in this dereliction of parental duty is all too apparent as revealed by child mortality tables.

Conversely, for those children who are kept restrained by dutiful parents, the boredom associated with the lack of visibility and mobility together with the motion of the vehicle frequently causes such children to fall asleep. Where the only means of restraint is the seat belt assembly, the child typically slumps forward or to the side in a manner which is both uncomfortable and unsafe in the event of an accident. Furthermore, due to their small size, such children may actually slip from beneath the seat belt and the parent, due to the obligations of operating the vehicle, may be unable to rectify the situation.

Therefore, it has long been known that is would be desirable to have a support apparatus which is particularly well suited to the protection of small children beyond the age of infancy operable to retain the child in a safe and protected attitude during transport in the vehicle, whether the child is awake or asleep, and which so operates in a manner which is both entertaining to the child as well as comforting.

SUMMARY OF THE INVENTION

Therefore, it is an object of the present invention to provide an improved support apparatus.

Another object is to provide such a support apparatus which is principally adapted to provide protection for small children beyond the age of infancy having exceeded the size which infant safety seats are capable of handling.

Another object is to provide such a support apparatus which operates in conjunction with the adult sized vehicle seat and seat belt assembly, but which affords additional protection for the child in such a fashion as to provide a degree of safety not heretofore achieved in the art.

Another object is to provide such a support apparatus which operates to ensure that parents operating vehicles and transporting children beyond the age of infancy will be significantly less inclined to permit such children to be released from the restraint afforded by the seat belt assembly.

Another object is to provide such a support apparatus which operates to provide transitional safety measures for children between an age in which infant safety seats can be employed and an age at which they are sufficiently developed to be adequately protected by the adult safety equipment of vehicles.

Another object is to provide such a support apparatus which functions to provide safety for the child equally well during both the times when the child is awake and asleep.

Another object is to provide such a support apparatus which affords a degree of entertainment and comfort to the child during use so as to minimize the possibility that the child will want to free him or herself from the seat belt assembly.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the support apparatus of the present invention, having a base member adapted to be secured in substantially fixed position on a supporting object and having a surface deployed for engagement by the child in a substantially rested position thereon; and arm assemblies borne by the base member positionable for engagement with a portion of the child in supporting relation in a predetermined attitude when the child is in the rested position.

DESCRIPTION OF THE PREFERRED EMBODIMENT

Figure 1:
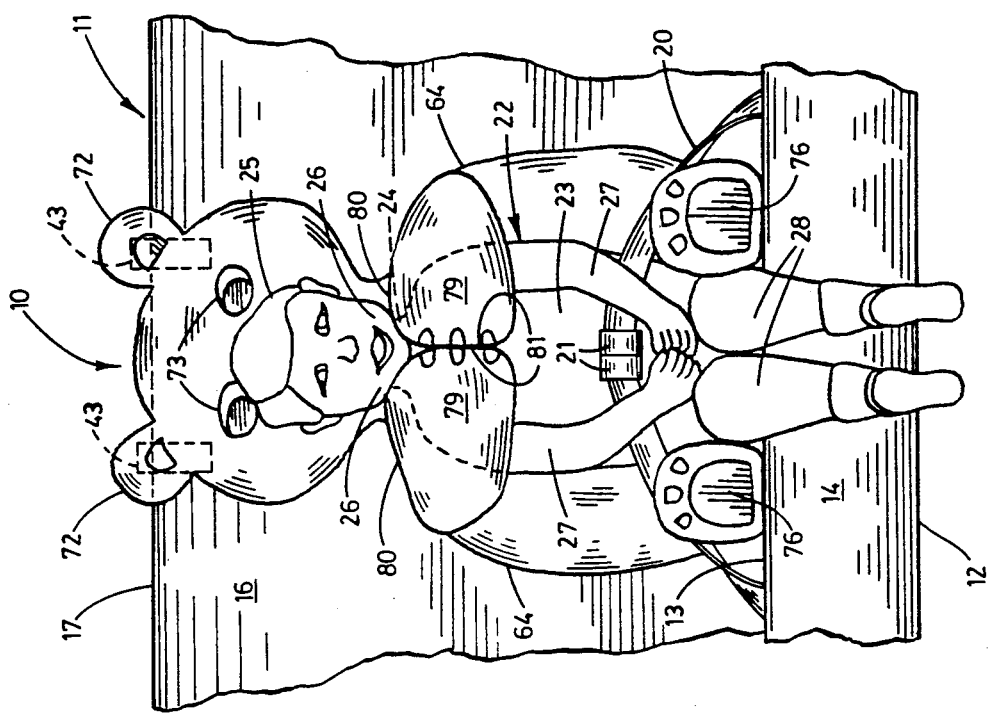
FIG. 1 is a fragmentary, front elevation of the support apparatus of the present invention shown in a typical operative environment restraining a child in an upright attitude in an adult vehicle seat using the seat belt assembly.

Referring more particularly to the drawings, the support apparatus of the present invention is generally indicated by the numeral 10 in FIG. 1. The support apparatus is shown in FIG. 1 in a typical operative environment in which it is mounted in a vehicle or automobile seat 11. The support apparatus can be employed in virtually any seat, but has particular utility in a vehicle seat such as that of an automobile.

The automobile seat 11 has a bottom portion 12 having an upper surface 13 and a front surface 14. The automobile seat has a back portion 15 having a front surface 16 and a rounded upper surface 17.

A conventional seat belt assembly 20 is mounted in the vehicle for use in conjunction with the automobile seat 11 and has a fastening assembly 21 operable in the conventional fashion. For illustrative convenience, a child beyond the age of infancy, but not sufficiently developed to entirely take care of himself in the automobile seat is represented at 22. The child has a torso 23, neck 24 and head 25. For purposes of describing the operation of the support apparatus 10, it will be noted that the child has cheeks 26, arms 27 and legs 28.

Figure 3:
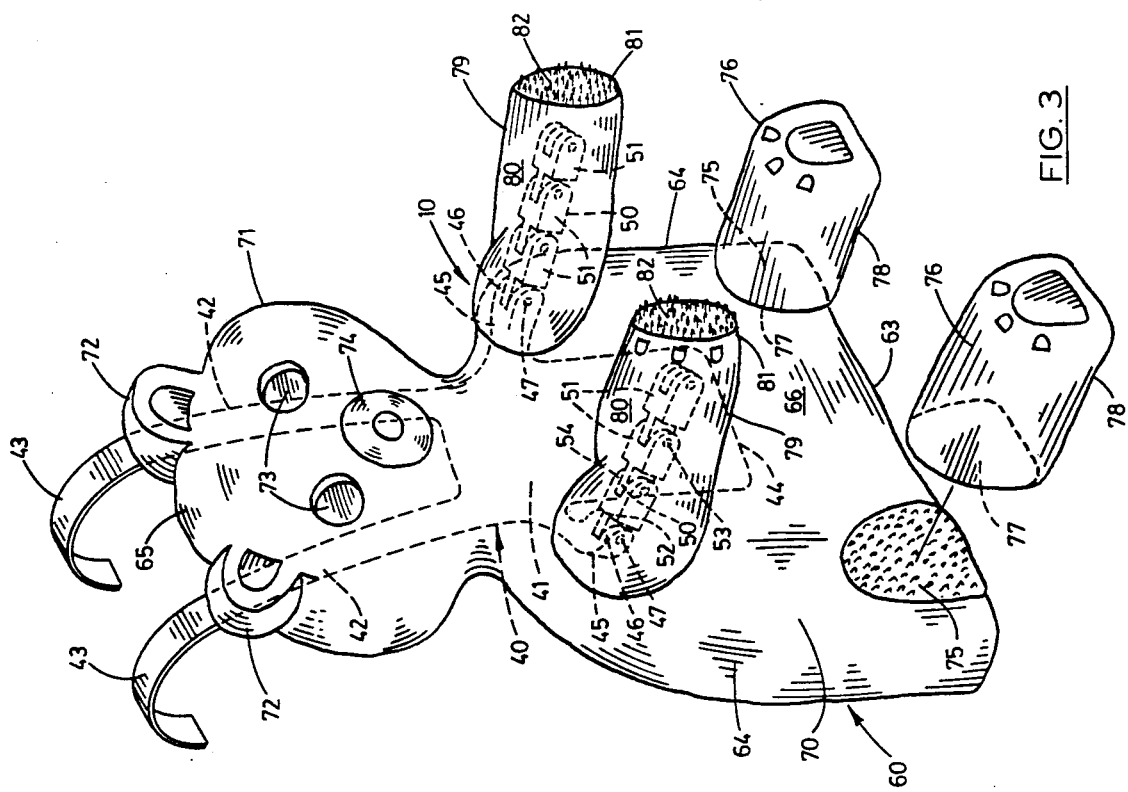
FIG. 3 is a somewhat enlarged perspective view of the support apparatus of the present invention showing the frame and arm assemblies thereof in hidden lines and one leg separated from the body for illustrative convenience.

Referring more particularly to FIG. 3, the support apparatus 10 has a frame assembly 40 which is preferably constructed of a suitable metal. The frame assembly has a central portion 41 having upwardly extending arm portions 42 terminating in hook portions 43. The central portion of the frame assembly has a lower edge 44.

The frame assembly 40 mounts a pair of arcuate arm projections 45 extending forwardly from the central portion 41 and each having a clevis end portion 46 mounting a pin 47.

An arm assembly 50 is mounted on each of the arcuate arm projections 45 as shown in FIG. 3. The arm assemblies can be constructed in any suitable fashion, but in the preferred embodiment include a plurality of links 51. Each of the links has a pivot portion 52, a pin 53 and a clevis end portion 54. The links 51 of each arm assembly are interconnected in the fashion shown in hidden lines in FIG. 3 wherein the pivot portion 52 is pivotally mounted on the pin 47 or 53 of the preceding clevis end portion 46 or 54. The interconnection of the links is such as to permit, when subjected to significant force, pivotal movement about the pins 47 and 53. However, the interconnection, conversely, is such as to resist such deformation without the application of significant force.

The frame assembly 40 is encapsulated in a stuffed or cushioned body 60 preferably of padded or stuffed material so as to be compressible in such a manner as to absorb both the weight of the child and the forces attendant to operation of the vehicle. The body has a back surface 61 mounting a slip resistant surface 62 of any suitable material. The body has a substantially flat bottom surface 63 and lateral surfaces 64. The body has a top surface 65 and a front surface 66.

As shown in the drawings, in the preferred embodiment the body 60 of the support apparatus is so constructed as to suggest or represent a bear or other animal recognizable and comforting to children of the age described. Accordingly, the body has a torso 70 and a head 71. Ears 72 are mounted on the head in position so as somewhat to disguise the presence of the hook portions 43. The head has eyes 73 and a nose 74. "Velcro" panels 75 are mounted on the front surface 66 in spaced relation to each other and adjacent to the bottom surface 63 of the body. Legs 76 having individual "Velcro" panels 77 are releasably secured on the body by the interconnection of the "Velcro" panels 75 and 77. The legs have lower surfaces 78 of substantially flat configuration. The arm assemblies 50 are encapsulated in padded or cushioned front legs or arms 79 having cushioned outer surfaces 80. The cushioned arms have terminal end portions 81 each individually mounting a "Velcro" panel 82.

OPERATION

The operation of the described embodiment of the subject invention is believed to be clearly apparent and is briefly summarized at this point. The support apparatus 10 is entirely removable from any vehicle in which it has been used. It is installed in a vehicle simply by positioning the hook portions 43 over the upper surfaces 17 of the back portion 15 of the automobile seat 11 with the slip resistant surface 62 and in engagement with the front surface 16 of the back portion 15 of the seat. The support apparatus is positioned in the portion of the automobile seat 11 at which the child 22 is to be restrained.

Figure 2:
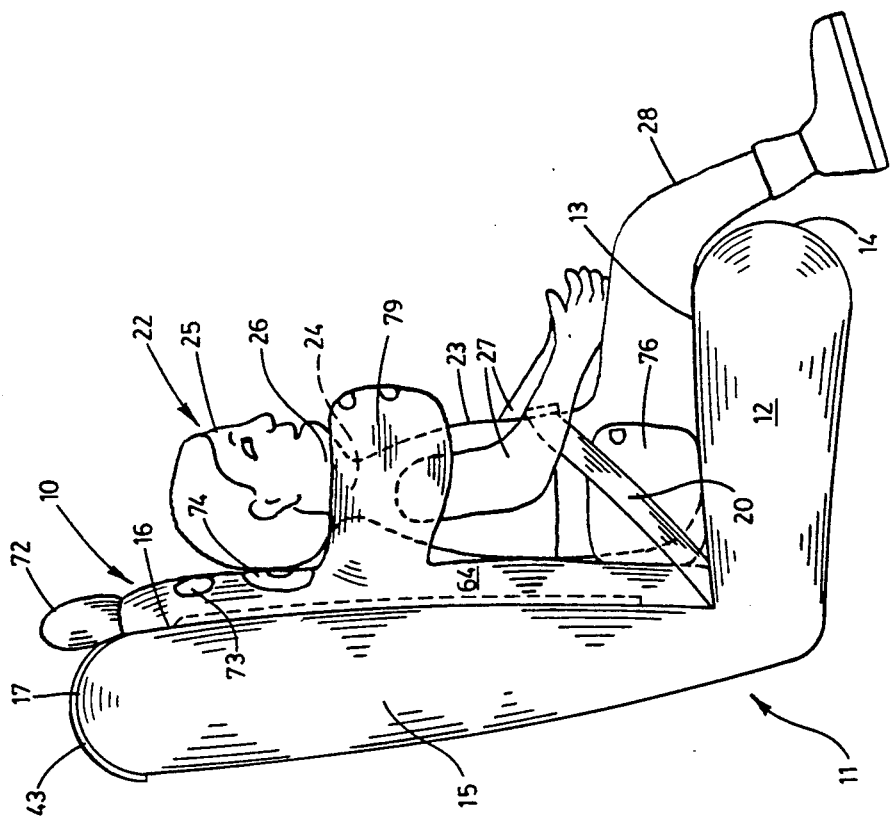
FIG. 2 is a side elevation of the support apparatus as shown in FIG. 1.
Figure 4:
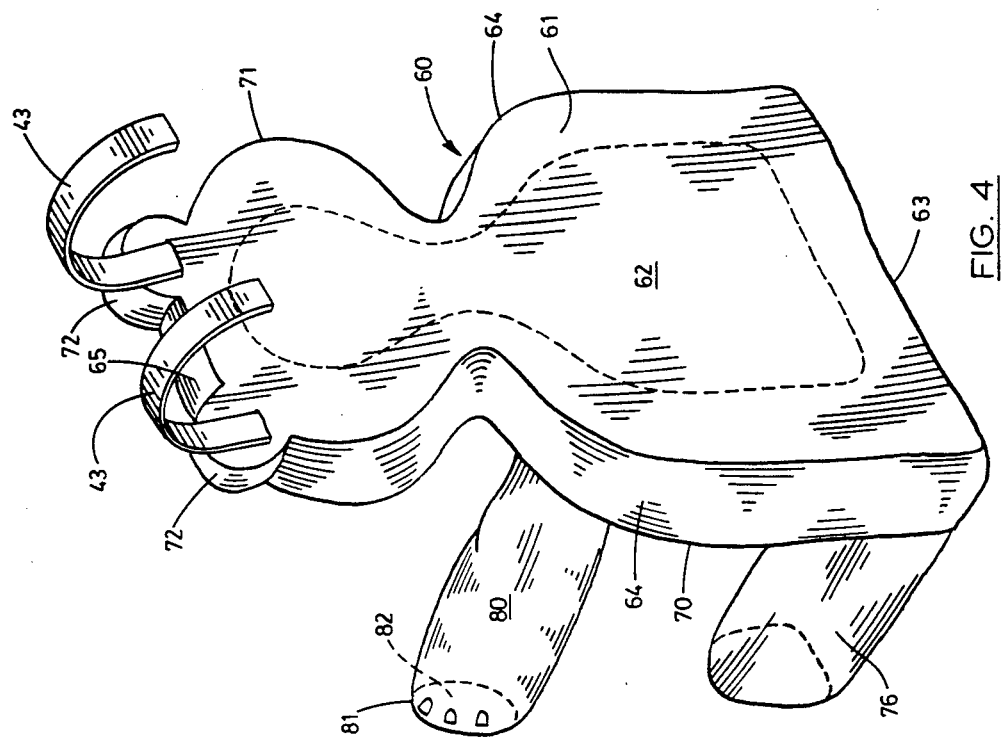
FIG. 4 is a rearward perspective view showing the slip resistant surface on the back of the stuffed body of the support apparatus.

The child 22 is positioned in a seated position on the bottom portion 12 of the automobile seat 11 with the torso 23 rested against the front surface 66 of the body 60 of the support apparatus, as shown in FIGS. 1 and 2. The seat belt assembly 20 is then positioned about the torso 23 of the child and the fastening assembly 21 employed to secure the child in the automobile seat with the seat belt assembly. The legs 76, are positioned as shown in FIGS. 1 and 2 in supporting relation to the torso 23 of the child. For ease of placing the child in the support apparatus, the legs are detachable, by virtue of the "Velcro" panels 75 and 77, prior to positioning the child and can conveniently be reattached after such positioning. The legs can be detached from the body and left detached for purposes of adjusting to the size of larger children.

Once the child 22 is positioned and secured, the cushioned arms 79 are moved toward each other about the neck 24 of the child so that the cushioned outer surfaces 80 are disposed in supporting relation to the cheeks 26 of the child as shown in FIGS. 1 and 2. The force exerted against the resistance imparted by the arm assemblies 50 within the cushioned arms is sufficient snugly to position the cushioned arms in the position described without being uncomfortably tight. The "Velcro" panels 82 on the terminal end portions 81 of the cushioned arms are engaged in facing relation so as to afford additional restraining force holding the cushioned arms in the arcuate positions described.

The child 22 is now restrained as shown in FIGS. 1 and 2 for transport in the vehicle. The retentive pressure provided by the cushioned arms 79 is such as to ensure that the child is restrained in the attitude shown even if he tries to free himself. Conversely, the child's arms 27 and legs 28 are free permitting a sense of freedom. The engagement of the cushioned arms with the cheeks 26 of the child subtly but dependably retains the child's head 25 in the upright position shown. This is the case whether the child is awake or asleep. Accordingly, the seat belt assembly is operable to perform its function in the event of a sudden stop or accident. Still further, the entertainment value and comfort provided by the shape of the body suggesting an animal such as a bear or the like is sufficient to hold the child's attention and to comfort the child during transport in the vehicle. Accordingly, the parent operating the vehicle is free to devote his or her attention to operation of the vehicle without the distraction of the child's emotional reaction to restraint and, more significantly, without the distraction caused by an unrestrained child moving about the vehicle. Even if the child initially or after the passage of time resists the restraint, the parent can leave the child unattended and be confident that the child cannot free him or herself and is fully protected in the event of a sudden stop or accident.

Therefore, the support apparatus of the present invention provides a fully reliable and convenient means by which a parent can restrain a child beyond the age of infancy in the seat belt assembly of the vehicle comfortably, conveniently, and dependably while affording the child a degree of comfort and entertainment which ensures that resistance to use of the support apparatus is virtually nonexistent.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A support apparatus operable to support a child or the like in a seated position in a vehicle seat having a bottom portion and a substantially right-angularly related back portion, the support apparatus comprising
   A. a frame assembly having a pair of hook members extended therefrom for engagement with the back portion of the vehicle seat;
   B. a pair of arm assemblies mounted on the frame assembly in spaced relation to each other and each composed of a plurality of links so interconnected as to be adjustable into a substantially arcuate configuration resistant to deformation therefrom;
   C. a cushioned body substantially encapsulating the frame assembly for the positioning of the torso of the child in seated position on the bottom portion of the vehicle seat with the child's back rested against said cushioned body; and
   D. cushioned arms individually substantially encapsulating the arm assemblies for positioning in said arcuate configurations to extend in a supporting configuration about the neck of the child, when the child is in said seated position, in supporting relation to the child's head.

2. The support apparatus of claim 1 wherein the cushioned arms have terminal end portions and the support apparatus has
   E. panels individually mounted on the terminal end portions of the cushioned arms, the panels having hook and loop fasteners for engagement with each other releasably to retain the cushioned arms in said supporting configuration.

3. The support apparatus of claim 2 wherein said cushioned body has a substantially flat bottom surface for engagement with the bottom portion of the vehicle seat whereby, with said hook members of the frame assembly, the cushioned body is retained in substantially fixed position relative to the vehicle seat.

4. The support apparatus of claim 3 including
   F. cushioned legs mounted on said cushioned body adjacent to said substantially flat bottom surface and in spaced relation to each other for supporting engagement with the torso of the child when the child is in said seated position.

5. The support apparatus of claim 4 including a panel mounted on the cushioned body for engagement with the back portion of the vehicle seat and operable to resist movement therebetween.

* * * * *